June 3, 1941.   R. S. TAYLOR   2,244,133
TRANSMISSION
Filed Dec. 3, 1937   4 Sheets-Sheet 1

INVENTOR
ROBERT S. TAYLOR
BY Charles J. Evans
HIS ATTORNEY

June 3, 1941.  R. S. TAYLOR  2,244,133

TRANSMISSION

Filed Dec. 3, 1937  4 Sheets-Sheet 2

INVENTOR
ROBERT S. TAYLOR
BY Charles S. Evans
HIS ATTORNEY

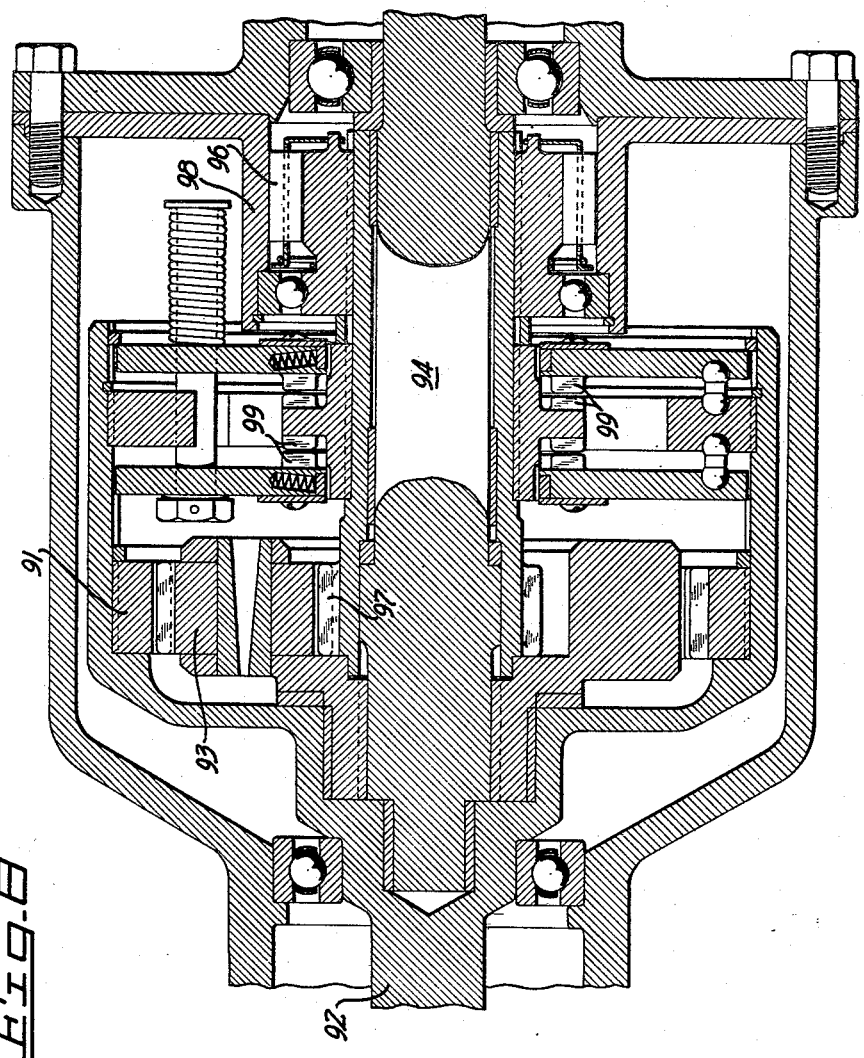

Patented June 3, 1941

2,244,133

UNITED STATES PATENT OFFICE 2,244,133

TRANSMISSION

Robert S. Taylor, Seattle, Wash.

Application December 3, 1937, Serial No. 177,902

35 Claims. (Cl. 74—259)

My invention relates to an auxiliary speed change transmission, such as an overdrive gearing; and the broad object of the invention is to provide improved means for cutting the gearing into and out of the drive train.

A more specific object of the invention is to provide a transmission which connects the gearing into the drive train when the driven shaft of the gearing overruns the drive shaft, and cuts the gearing out when the torque between drive and driven shafts reaches a predetermined value.

Another object of the invention is to provide a direct drive connection between the shafts when the gearing has been cut out, and to provide freewheeling in the direct drive relationship.

The invention possesses other objects and features of advantage, some of which, with the foregoing, will be set forth in the following description of my invention. It is to be understood that I do not limit myself to this disclosure of species of my invention as I may adopt variant embodiments thereof within the scope of the claims.

Referring to the drawings:

Figure 8 is an axial sectional view of an underdrive transmission embodying my invention.

Figures 1, 2:
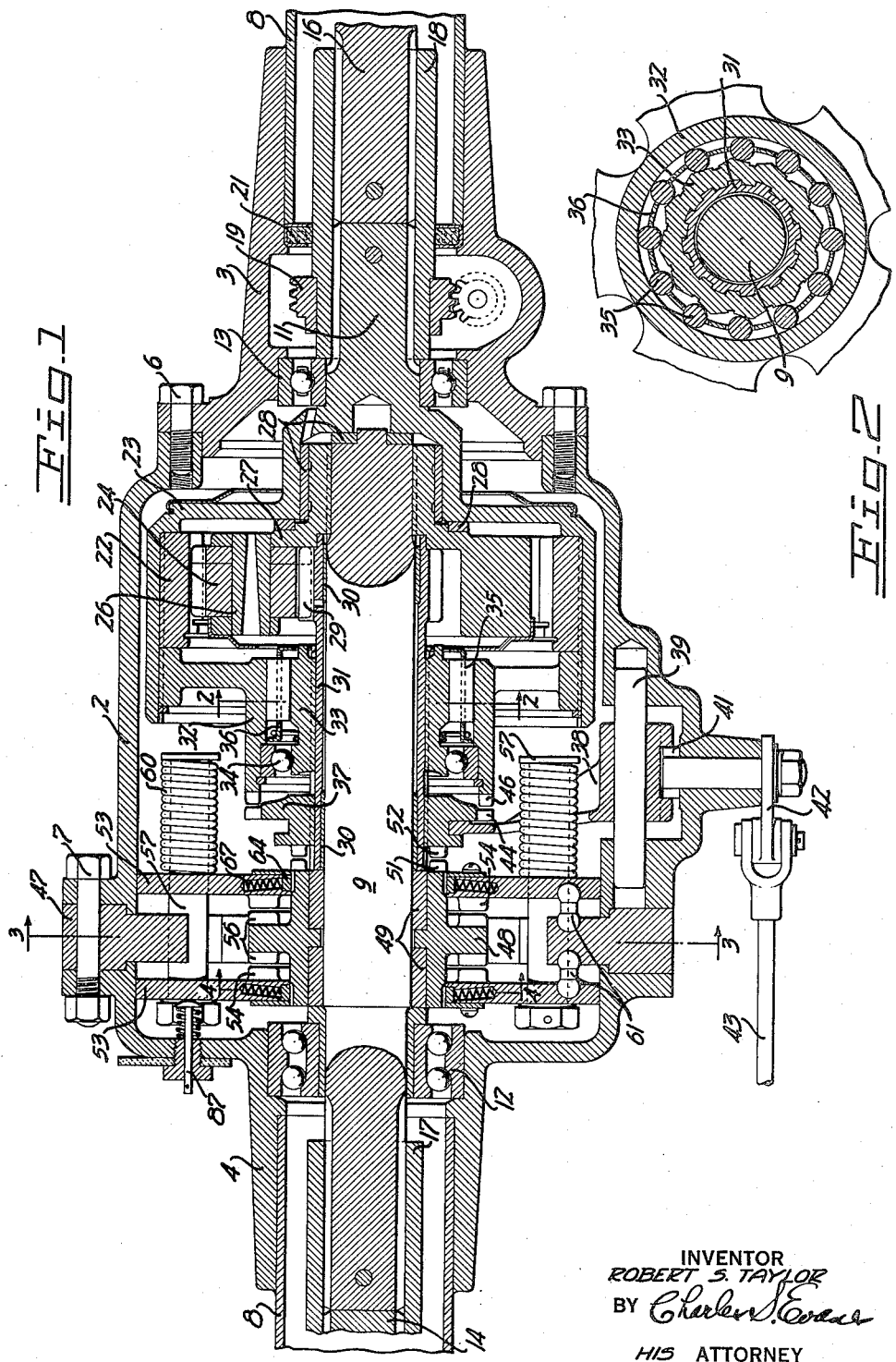
Figure 1 is an axial sectional view showing a transmission embodying the improvements of my invention.
Figure 2 is a transverse vertical sectional view of the transmission, taken in a plane indicated by the line 2—2 of Figure 1, and showing the one-way clutch between the parts of the planetary gear system.

In terms of broad inclusion, the transmission embodying my invention comprises drive and driven shafts, and a planetary gear system connecting the shafts and providing a stress train for transmitting torque from the drive to the driven shaft. A one-way clutch is interposed between parts of the train for connecting the shafts together for unitary rotation when the drive shaft tends to overrun the driven shaft; and a brake is arranged to connect the shafts together through the gear system when the driven shaft tends to overrun the drive shaft. Means responsive to torque conditions between the shafts are also provided for disengaging the latter brake. Means are additionally preferably provided for optionally locking the shafts together for unitary rotation, or for operatively connecting the gear system with the torque controlled brake.

In greater detail, and referring to the drawings, the transmission embodying my invention is contained in a housing adapted to be interposed in the torque tube of an automobile, and preferably comprising an intermediate section 2 fastened to end sections 3 and 4 by suitable studs and bolts 6 and 7. The end sections are formed with necks adapted to be connected with the end portions 8 of the torque tube. While the transmission is shown interposed in a torque tube behind the ordinary speed change transmission, it is understood that the unit may be incorporated in the drive train ahead of the ordinary transmission.

A drive shaft 9 and driven shaft 11 are provided in the housing, journaled in suitable bearings 12 and 13. These shafts are axially aligned and are connected to driving and driven sections 14 and 16 of the propeller shaft by suitable sleeves 17 and 18. Driven sleeve 18 also preferably carries the speedometer gear 19, and an oil retaining ring 21 is preferably interposed between the sleeve and housing.

A planetary gear system is arranged in the housing and comprises an orbit or ring gear 22 splined in a cup-shaped rotor 23 formed on the end of driven shaft 11. The planet pinion 24 of the planetary system is journaled on a shaft 26 carried by a spider 27 splined on the inner end of drive shaft 9. A plurality, say three, of these planet pinions are provided. The hub of spider 27 is preferably journaled in the recessed end of rotor 23, and suitable bearing rings 28 are provided between these parts.

The sun gear 29 of the planetary system is mounted on the inner end of a sleeve 31 journaled on drive shaft 9 on suitable bearings 30. By this arrangement of the planetary gears a speed increase or overdrive is provided when the sun gear is held against rotation, as will be readily understood. If the sun gear is not held the planetary system is of course ineffective, since the sun gear will merely spin freely.

A one-way clutch is interposed between parts of the planetary gear system, preferably between the orbit and sun gears. For this purpose a pair of overrunning clutch rings 32 and 33 are provided, separated by a bearing 34; the outer ring 32 being splined in orbit gear rotor 23 and the inner ring being splined on sun gear sleeve 31. A series of clutch rollers 35 are arranged between the rings, and are urged counterclockwise as viewed in Figure 2 by a spring turned cage 36. In this normal position of the rollers the latter are wedged between the clutch rings by the inclined faces on the inner ring.

This locks the sun gear to the orbit gear when the sun gear tends to rotate clockwise, but leaves the sun gear free to spin counterclockwise if it is not otherwise held. Therefore, in the position of the parts shown in Figure 1, clockwise rotation of the drive shaft results in the planet gears tending to rotate the sun gear clockwise relative to the orbit gear; all references to clockwise and counterclockwise rotation being taken as viewed from the left in Figure 1. But relative clockwise rotation of the sun gear is prevented by the one-way clutch rollers 35, so that the planetary system is locked for unitary rotation. As a result, the drive and driven shafts are connected together for direct drive.

This condition is maintained as long as the drive shaft tends to overrun the driven shaft. When the driven shaft tends to overrun the drive shaft however, the planet pinions turn the sun gear counterclockwise, which it is free to do. Thus the driven shaft is free is overrun the drive shaft, giving the ordinary free-wheeling principle.

Means are also provided for optionally locking the sun gear to the orbit gear so that they are positively fixed for unitary rotation. For this purpose a clutch member 37 is slidably splined on sun gear sleeve 31, and is shiftable by a yoke 38 slidably mounted on pin 39. The yoke is moved by an eccentric cam 41 turned by a crank 42 connected to a suitable lever in the driver's compartment by a connecting rod 43. In the position of the clutch member shown in Figure 1 the sun gear is free to rotate, except as limited by the one-way clutch rollers 35. When the clutch member is shifted back however, the clutch teeth 44 are engaged with teeth 46 on ring 32, thus positively locking the sun and orbit gears together in either direction of rotation of the sun gear. This locks out the one-way clutch in event free-wheeling is not desired.

Also, positive clutching of the parts together permits the car to be placed in reverse, and when my transmission is located behind the ordinary transmission a suitable connection is made between the regular shifting mechanism and connecting rod 43 so that clutch member 37 is always shifted back when the car is put in reverse. In other words, member 37 is optionally shiftable at the will of the driver, but is always moved back by the act of putting the car in reverse. Of course if my transmission is located ahead of the ordinary speed change transmission the shifting back of clutch member 37 when the car is put in reverse is not necessary, because then the rotation of the drive shaft is always clockwise.

Means are also provided for holding the sun gear against rotation to connect the shafts together through the overdrive gearing. For this purpose an annular ring or fixed element 47 is bolted between sections 2 and 4 of the housing, and means are provided for releasably locking the sun gear to this fixed element. The releasable brake comprises a central brake element or ring 48 freely journaled on the drive shaft on suitable bearings 49. This brake ring is connected for rotation with the sun gear whenever the manually shiftable member 37 is moved ahead to engage teeth 51 and 52.

A pair of brake elements or plates 53 are mounted adjacent each side of the central brake ring 48 and are adapted to engage the latter through an annular series of teeth 54 on the plates capable of meshing a complementary series of teeth 56 on opposite sides of the brake ring. Plates 53 are adapted to move toward and away from each other to engage and disengage the central brake ring, and are also capable of a limited degree of rotational movement. The plates are connected by a plurality of pins or bolts 57 extending through notches 58 in the fixed element. These notches limit rotational movement of the plates, and blocks 59 are provided on several of the pins for slidably engaging the notches. See Figure 3.

The inner ends of pins 57 project beyond the inside plate and each has a spring 60 compressed between the end of the pin and plate. These springs serve to press the plates together, tending to engage the latter with the central brake ring 48. A series of toggles 61 are interposed between the fixed element 47 and plates 53. These toggles are preferably in the nature of round nosed pieces arranged on opposite sides of the fixed element and seated in sockets provided in the fixed element and plates.

Figure 6:
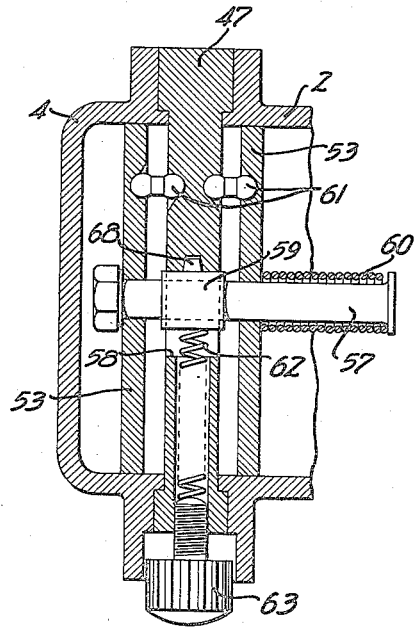
Figures 6 and 7 are fragmentary sectional views, taken in a plane indicated by line 6—6 of Figure 3, and showing the torque controlled brake toggles in extended and collapsed positions, respectively.

When the brake plates 53 are rotated clockwise to the limit of rotation in this direction permitted by pins 57 in notches 58, the toggles 61 are moved to extended positions to spread plates 53 out of engagement with the central brake element 48. This opening of the toggles to extended positions is of course resisted by springs 60. Figures 1 and 6 show the relationship between the parts when the toggles are extended.

Figure 5:
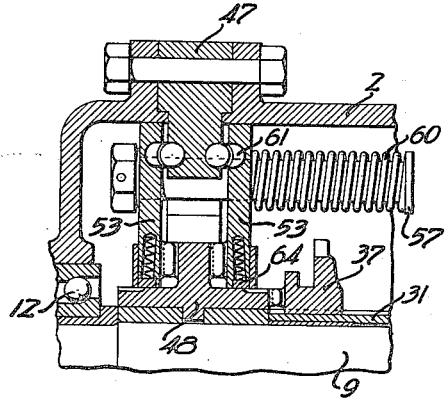
Figure 5 is a fragmentary axial sectional view of the transmission, showing the torque controlled brake in its engaged position.
Figure 7:
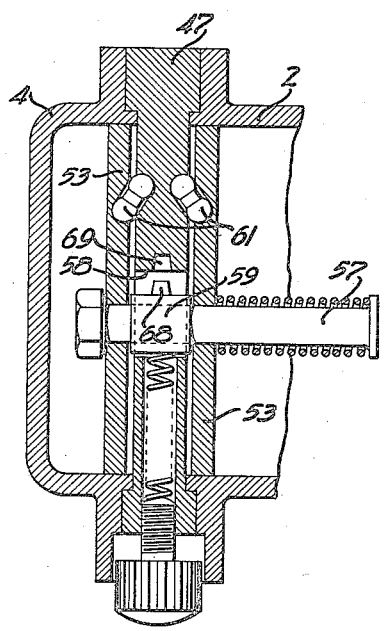

When the brake plates are rotated counterclockwise to the limit of rotation in the opposite direction permitted by pins 57 in notches 58, the toggles 61 are collapsed to bring plates 53 together and into engagement with the central brake element 48. Figures 5 and 7 show the parts with the toggles collapsed. It will be noted that plates 53 close with a combined inward and turning motion, due to the toggle action. This particular movement insures a positive and smooth engagement of the clutch teeth 54 and 56.

By this arrangement it is seen that plates 53 will spread to disengage the brake when the clockwise torque of the central brake element 48 is sufficient to overcome the resistance which springs 60 offer to the opening of the toggles. After the toggles start opening, the teeth 54 and 56 commence to disengage. It is therefore desirable to insure complete opening of the toggles after the opening movement has once started. For this purpose a plurality of springs 62 are provided to bear against blocks 59. These springs urge the plates clockwise and function to snap the toggles into final open positions. Adjusting screws 63 are provided for altering the compression of these springs.

Figure 4:
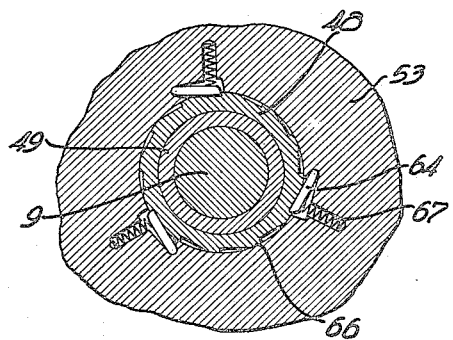
Figure 4 is another transverse vertical sectional view, taken in a plane indicated by the line 4—4 of Figure 1, and showing the ratchets between the brake elements.

Rotation of brake plates 53 counterclockwise, for the purpose of collapsing the toggles to engage the clutch, is also derived from rotation of the central brake element 48. As shown in Figures 1 and 4, a series of ratchets 64 are mounted on the inner peripheries of the brake plates for engaging ratchet teeth 66 formed in the central element 48. The ratchets are pressed by light springs 67; and the ratchet teeth are formed to permit free rotation of brake element 48 clockwise, but to turn plates 53 with element 48 when the latter tends to rotate counterclockwise.

Two of the blocks 59 are preferably provided with plug-like projections 68 for seating in sockets 69 provided in fixed element 47, so that the plugs enter the sockets and serve as cushioning means to quiet the stop when the transmission changes from overdrive to direct.

The operation of the torque controlled clutch is as follows: Consider that the optionally shiftable clutch member 37 is at the left to lock central element 48 with the sun gear, and also consider that plates 53 of the releasable brake are open. Under these conditions, the parts of the planetary system are locked together for direct drive by the one-way clutch rollers 35 so long as the drive shaft tends to overrun the driven shaft (which condition obtains under driving load). At this time the central brake element 48 merely turns clockwise, which it is free to do since ratchets 64 do not prevent it.

However, when the driven shaft tends to overrun the drive shaft (which condition obtains under coasting load), the sun gear tends to run counterclockwise. This turns brake plates 53 counterclockwise through ratchets 64, thus collapsing toggles 61 to engage the brake plates and lock the sun gear to the fixed element. With the sun gear locked against rotation the pinions 24 planetate about it, causing the orbit gear to rotate faster than the drive shaft. One-way clutch rollers 35 do not interfere with such relative rotation since its outer ring 32 is free to overrun the inner ring 33. The shafts are thus connected together through the planetary overdrive.

This overdrive connection will be maintained as long as the brake plates 53 remain engaged. The torque of the sun gear of course is transmitted from central clutch element 48 to the brake plates 53, tending to turn them clockwise and open the toggles. But considerable torque is necessary to do this, because the angle between the toggles is relatively small and great force is required to open them against spring 60. It will be observed that the force required to open the toggles is greatest at the start and decreases rapidly as the toggles spread apart. This insures that any force sufficient to start the toggles opening is ample to complete the brake release motion.

The releasable brake is designed to keep the car in overdrive until the torque of the sun gear exceeds a predetermined value. This brake releasing torque is calculated to cut out the overdrive before the load on the motor becomes too great. When the torque controlled brake releases the sun gear the shafts are immediately connected for direct drive by the one-way clutch rollers 35, because at this time the drive shaft is tending to overrun the driven shaft. The direct drive will then be maintained until such time as the driven shaft again tends to overrun the drive shaft, providing of course that the manually controlled clutch member 37 remains in its forward position of engagement with the torque controlled brake unit. As long as the torque controlled clutch is in operation the driver may put the car in overdrive at any time by releasing the throttle and then pressing in and letting out the regular foot clutch pedal. The effort of the car wheels to speed up the motor will then force the sun gear counterclockwise to collapse the toggles and engage brake plates 53.

Figure 3:
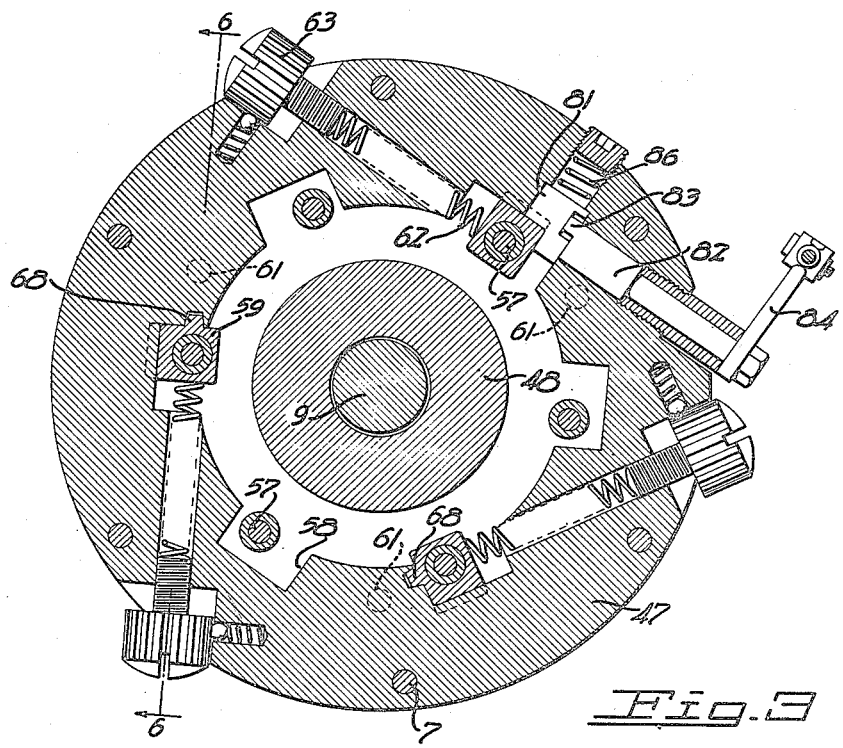
Figure 3 is a transverse vertical sectional view, taken in a plane indicated by the line 3—3 of Figure 1, and showing the torque controlled brake mechanism.

Means are provided for locking the shafts together through the overdrive. As shown in Figure 3, a slidable block 81 is arranged in the fixed element 47, and is adapted to be interposed between one of the blocks 59 and the end of its notch. Block 81 is normally up out of the way (as seen in Figure 3), but may be brought down when blocks 59 are back in the collapsed position of the toggles. Movement of block 81 is controlled by a shaft 82 journaled in the fixed element and having an eccentrically disposed pin 83 engaging the block so that the latter is moved in and out when the shaft is rotated by a crank 84 connected to a suitable knob or lever in the driver's compartment. A spring 86 behind the block assists the latter's inward movement when crank 84 is rotated.

The transmission of my invention therefore provides means for cutting the overdrive gearing into and out of the drive train; depending upon the rotational relationship and torque conditions between the shafts. The mechanism also permits the operator to optionally lock the shafts for direct drive; or connect them for direct drive with free-wheeling; or connect them through the torque controlled overdrive; or lock them together through the overdrive.

Indicating means may be provided for showing when the transmission is in overdrive. Thus an insulated spring pressed pin 87 may be arranged in the housing for contact by one of the brake plates 53 when the latter are separated. Pin 87 is connected to one leg of a grounded signal circuit including a colored lamp on the dash board, so as to indicate when the torque controlled brake is engaged and the unit is in overdrive.

If desired, the bolts 57 which connect the brake plates 53 may be centrally positioned so that the bolts project out an equal distance from each of the plates, and springs arranged on both ends of the bolts. This would reduce the length of springs 60 and also provide a more balanced unit.

A feature of my invention is that the one-way clutch and one-way brake cooperate with the planetary gear train to automatically lock driven shaft 11 to fixed reacting element 47 when the driven shaft is rotated reversely. In other words, my transmission also functions as a hillholder to prevent the car from rolling backwards. Thus, upon backward turning of driven shaft 11 the one-way clutch locks up the planetary gear system, causing the sun gear to turn backwards and collapse plates 53 of the one-way brake, thereby locking the driven shaft against further backward rotation. Of course, when the regular transmission is put in reverse gear the clutch member 37 of my unit is shifted to disconnect the one-way brake and lock up the planetary system so that the driven shaft may be rotated reversely.

While I have shown an overdrive gearing, it is understood that the planetary system may be connected to provide an underdrive. In the latter case as shown in Figure 8, the orbit gear 91 is connected to the drive shaft 92 and the planet pinion 93 to the driven shaft 94. In this relationship the one-way brake 96 is arranged to lock the sun gear 97 to the fixed element 98, and the torque controlled clutch 99 interposed between the sun and orbit gears to lock the system together for rotation as a unit. With this combination, the load is first picked up and carried through the direct drive until the load releases the torque controlled clutch. Then the one-way brake locks the sun gear to give the underdrive. This underdrive relationship is then maintained until the driven shaft tends to overrun the drive shaft, at which time the torque controlled clutch is again engaged to lock the gearing in direct.

In either case, overdrive or underdrive, the broad combination of elements is the same; namely, means for connecting the shafts together for unitary rotation; a planetary gear system; and means for connecting the shafts together through the gear system, one of the means being responsive to torque conditions between the shafts. In other words, in both cases, the transmission comprises a planetary gear system including orbit, planet and sun gears, one of the gears being connected to the drive shaft and another to the driven shaft; means for locking the gears of the system together for rotation as a unit to connect the shafts together for direct drive; and means for holding one of the gears against rotation to drivably connect the shafts together through the gearing, one of the means being a one-way device and the other being torque controlled and actuated by the torque of one of the gears (sun gear).

I claim:

1. A transmission comprising drive and driven shafts, a planetary gear system including orbit, planet and sun gears, one of said gears being connected with the drive shaft and another with the driven shaft, a one-way clutch interposed between two of said gears, a fixed element, brake means for connecting one of the gears to the fixed element, and means operable to release said brake means to free the gear from the fixed element when the torque of said latter gear exceeds a predetermined value.

2. A transmission comprising drive and driven shafts, a planetary gear system including orbit, planet and sun gears, one of said gears being connected with the drive shaft and another with the driven shaft, a one-way clutch interposed between two of said gears, a fixed element, a brake engageable upon rotation of one of said gears in one direction for connecting said latter gear to the fixed element, said brake being disengageable upon rotation of said last mentioned gear in the opposite direction, and means for holding the brake engaged until the torque of the last mentioned gear exceeds a predetermined value.

3. A transmission comprising drive and driven shafts, a planetary gear system including orbit, planet and sun gears, the orbit gear being connected with the driven shaft and the planet gear with the drive shaft, a one-way clutch interposed between the orbit and sun gears, a fixed element, a brake engageable upon rotation of the sun gear in one direction for connecting said sun gear to the fixed element, said brake being disengageable upon rotation of the sun gear in the opposite direction, and means for holding the brake engaged until the torque of the sun gear exceeds a predetermined value.

4. A transmission comprising drive and driven shafts, a planetary gear system including orbit, planet and sun gears, the orbit gear being connected with the driven shaft and the planet gear with the drive shaft, a one-way clutch interposed between the orbit and sun gears, a fixed element, a brake element, releasable means for engaging the brake element with said fixed element, and means for optionally locking the sun gear to said brake element.

5. A transmission comprising drive and driven shafts, a planetary gear system including orbit, planet and sun gears, the orbit gear being connected with the driven shaft and the planet gear with the drive shaft, a one-way clutch interposed between the orbit and sun gears, a fixed element, a brake element, releasable means for engaging the brake element with said fixed element, and means for optionally locking the sun gear to said brake element or to the orbit gear.

6. A transmission comprising drive and driven shafts, a planetary gear system including orbit, planet and sun gears, one of said gears being connected with the drive shaft and another with the driven shaft, a one-way clutch interposed between two of said gears, a fixed element, a brake element, means for connecting the brake element with one of said gears, a second brake element engageable with said first brake element for connecting the latter to the fixed element, means for engaging and disengaging the brake elements upon movement of said second brake element, and means for resisting disengagement of said brake elements.

7. A transmission comprising drive and driven shafts, a planetary gear system including orbit, planet and sun gears, one of said gears being connected with the drive shaft and another with the driven shaft, a one-way clutch interposed between two of said gears, a fixed element, a brake element, means for connecting the brake element with one of said gears, a second brake element engageable with said first brake element for connecting the latter to the fixed element, a toggle between the second brake element and said fixed element for engaging and disengaging the brake elements upon movement of said second brake element, and a spring for resisting disengagement of said brake elements.

8. A transmission comprising drive and driven shafts, a planetary gear system including orbit, planet and sun gears, one of said gears being connected with the drive shaft and another with the driven shaft, a one-way clutch interposed between two of said gears, a fixed element, a brake element, means for connecting the brake element with one of said gears, a second brake element engageable with said first brake element for connecting the latter to the fixed element, a toggle between the second brake element and said fixed element for engaging and disengaging the brake elements upon movement of said second brake element, a spring for resisting disengagement of said brake elements, and means connecting the second brake element for movement with the first to engage the brake elements.

9. A transmission comprising drive and driven shafts, a planetary gear system including orbit, planet and sun gears, one of said gears being connected with the drive shaft and another with the driven shaft, a one-way clutch interposed between two of said gears, a fixed element, a brake element, means for connecting the brake element with one of said gears, a second brake element engageable with said first brake element for connecting the latter to the fixed element, a toggle between the second brake element and said fixed element for engaging and disengaging the brake elements upon movement of said second brake element, a spring for resisting disengagement of said brake elements, and a ratchet connecting the second brake element for movement with the first to engage the brake elements.

10. A transmission comprising drive and driven shafts, a planetary gear system including orbit, planet and sun gears, one of said gears being connected with the drive shaft and another with the driven shaft, a one-way clutch interposed between two of said gears, a fixed element, a brake element, means for connecting the brake element with one of said gears, a second brake element engageable with said first brake element for connecting the latter to the fixed element, a toggle between the second brake element and said fixed element and collapsible to engage said brake elements and extendable to disengage the brake elements upon movement of said second brake element, and a spring resisting the extension of said toggle to hold the brake elements engaged.

11. A transmission comprising drive and driven shafts, a planetary gear system including orbit, planet and sun gears, one of said gears being connected with the drive shaft and another with the driven shaft, a one-way clutch interposed between two of said gears, a fixed element, a brake element, means for connecting the brake element with one of said gears, a second brake element engageable with said first brake element for connecting the latter to the fixed element, a toggle between the second brake element and said fixed element and collapsible to engage said brake elements and extendable to disengage the brake elements upon movement of said second brake element, a spring resisting the extension of said toggle to hold the brake elements engaged, and a spring for moving the toggle into extended position after being partially opened.

12. A transmission comprising drive and driven shafts, a planetary gear system including orbit, planet and sun gears, one of said gears being connected with the drive shaft and another with the driven shaft, a one-way clutch interposed between two of said gears, a fixed element, a brake element, means for connecting the brake element with one of said gears, a second brake element engageable with said first brake element for connecting the latter to the fixed element, a toggle between the second brake element and said fixed element and collapsible to engage said brake elements and extendable to disengage the brake elements upon movement of said second brake element, a spring resisting the extension of said toggle to hold the brake elements engaged, and means locking the brake elements in the engaged position.

13. A transmission comprising drive and driven shafts, a planetary gear system including orbit, planet and sun gears, one of said gears being connected with the drive shaft and another with the driven shaft, a one-way clutch interposed between two of said gears, a fixed element, a brake ring, a clutch plate adjacent each side of the brake ring and engageable with the latter for connecting the brake ring to the fixed element, toggles between the fixed element and said plates for separating the latter to disengage them from the brake ring upon movement of said plates, and springs for holding the plates against separation.

14. A transmission comprising drive and driven shafts, a planetary gear system including orbit, planet and sun gears, the planet gear being connected with the driven shaft and the orbit gear with the drive shaft, a fixed element, a one-way brake connected between the sun gear and fixed element, a clutch connected between the sun and orbit gears, and torque controlled means for operating the latter clutch.

15. A transmission comprising drive and driven shafts, a planetary gear system including orbit, planet and sun gears, the planet gear being connected with the driven shaft and the orbit gear with the drive shaft, a fixed element, a one-way brake connected between the sun gear and fixed element, a clutch engageable upon rotation of the sun gear in one direction for clutching said sun gear to the orbit gear, said latter clutch being disengageable upon rotation of the sun gear in the opposite direction, and means for holding the latter clutch engaged until the torque of the sun gear exceeds a predetermined value.

16. In a planetary gear system having orbit, planet and sun gears, means for holding one of said gears against rotation for planetary operation of said system, means for locking the gears together for rotation as a unit, and torque controlled means independent of speed conditions for releasing said gear holding means.

17. A speed change mechanism comprising a planetary system, a fixed element, means for connecting a part of the system to the fixed element, and means for disconnecting said part from the fixed element when the torque of said part under driving load exceeds a fixed value.

18. In combination, drive and driven shafts, a planetary gear system operatively connected between the shafts for establishing different speed ratios between said shafts, means for holding a part of said system against rotation and operable in response to the torque of said part under driving load to release said part independently of speed conditions, and means responsive to release of said part to lock said system for unitary rotation.

19. In combination, drive and driven shafts, a planetary gear system operatively connected between the shafts, and means operable in response only to turning of a part of said system under coasting load on the system for holding said part of said system against rotation and operable in response to the torque of said part and under driving load to release said part.

20. In combination, drive and driven shafts, a planetary gear system operatively connected between the shafts and having a sun gear tending to turn in one direction under driving load, means for holding the sun gear against rotation, and means responsive to turning of the sun gear in said direction for releasing it independently of speed conditions.

21. In combination, drive and driven shafts, a planetary gear system operatively connected between the shafts and having a sun gear tending to turn in one direction under driving load and in the opposite direction under coasting load, and means responsive only to turning of the sun gear in said opposite direction for holding it against rotation and responsive to turning of the sun gear in said first mentioned direction for releasing it.

22. In combination, drive and driven shafts, a planetary gear system operatively connected between the shafts and having a sun gear tending to turn in one direction under driving load and in the opposite direction under coasting load, and means responsive to turning of the sun gear in said opposite direction for holding it against rotation and responsive to turning of the sun gear in said first mentioned direction for releasing it when the torque of the sun gear in said first mentioned direction exceeds a fixed value.

23. In combination, drive and driven shafts, a planetary gear system operatively connected between the shafts and having a sun gear tending to turn in one direction relative to another rotating part of the system under driving load and in the opposite direction relative to said part under coasting load, and means responsive to relative turning movement in said opposite direction for locking the sun gear to said part and responsive to relative turning movement in said first mentioned direction for unlocking them.

24. In combination, drive and driven shafts, a planetary gear system operatively connected between the shafts and having a sun gear tending to turn in one direction relative to another rotating part of the system under driving load and in the opposite direction relative to said part under coasting load, and means responsive to relative turning movement in said opposite direction for locking the sun gear to said part and responsive to relative turning movement in said first mentioned direction for unlocking them when the torque in said first mentioned direction exceeds a predetermined value.

25. In combination, drive and driven shafts, a speed change system for effecting overdrive and direct drive connections between the shafts, means operable under coasting load on the system for establishing the overdrive connection between the shafts, and means operable under driving load on the system for establishing the direct drive connection between the shafts, both of said means operating independently of speed conditions.

26. In combination, drive and driven shafts, a speed change system operatively connected with the shafts, means associated with said system for establishing a driving connection between the shafts and operable under torque to break said connection, and means for rendering said torque means inactive.

27. In combination, drive and driven shafts, a planetary gear system operatively connected with the shafts and having a sun gear, means for holding the sun gear against rotation and operable under torque to release it, means for locking said holding means against release, and means for controlling the locking means.

28. In combination, drive and driven shafts, a speed change system for effecting different speed ratios between said shafts, means operable under coasting load on the system for establishing a predetermined speed ratio between the shafts, means operable under driving load on the system for establishing another speed ratio between the shafts, and means for locking the system in one of said speed ratios.

29. In combination, drive and driven shafts, a planetary gear system operatively connected between the shafts and having orbit and sun gears, means releasable under torque for holding the sun gear against rotation, and a one-way clutch interposed between the sun and orbit gears.

30. In combination, drive and driven shafts, a planetary gear system operatively connected with the shafts and having a sun gear tending to turn in one direction under coasting load, and means including a fixed element and a pair of toothed elements for holding the sun gear against rotation, one of said toothed elements having a limited degree of turning movement relative to the fixed element and engageable with the other toothed element by said movement upon turning of the sun gear in said direction.

31. In combination, drive and driven shafts, a planetary gear system operatively connected with the shafts and having a sun gear tending to turn in one direction under driving load, and means including a pair of toothed elements engageable to hold the sun gear against rotation and disengageable under torque upon turning of the sun gear in said direction to release it.

32. In combination, drive and driven shafts, a planetary gear system operatively connected with the shafts and having a sun gear tending to turn in one direction under coasting load, and means including a pair of toothed elements engageable to hold the sun gear to establish a driving connection between the shafts, one of said elements being connected for rotation with the sun gear, and the other element being connected for limited turning movement with the sun gear in said direction to effect said engagement.

33. In combination, drive and driven shafts, a planetary gear system operatively connected with the shafts and having relatively rotatable parts, and means for connecting the parts for rotation together and including a pair of toothed elements engageable upon relative turning between the parts in one direction and disengageable upon relative turning in the opposite direction.

34. In combination, drive and driven shafts, a planetary gear system operatively connected between the shafts and having sun, planet, and orbit gears, a one-way clutch interposed between the sun and orbit gears, and a torque-controlled one-way brake for holding the sun gear against rotation.

35. In combination, drive and driven shafts, a planetary gear system operatively connected between the shafts and having sun, planet, and orbit gears and a fixed reacting element, said orbit gear being connected to the driven shaft, a one-way clutch interposed between the sun and orbit gears, and a one-way brake for locking the sun gear to the fixed reacting element, whereby said one-way clutch and said one-way brake serve as means for locking said driven shaft to the fixed reacting element when said driven shaft is rotated reversely.

ROBERT S. TAYLOR.